United States Patent [19]

Barrella et al.

[11] Patent Number: 5,316,874

[45] Date of Patent: May 31, 1994

[54] BATTERY CONNECTOR PROTECTION

[75] Inventors: Joseph N. Barrella, Irvington; Stanley Lewin, New Rochelle, both of N.Y.

[73] Assignee: Ultralife Batteries, Inc., Newark, N.Y.

[21] Appl. No.: 998,538

[22] Filed: Dec. 30, 1992

[51] Int. Cl.[5] ............................................. H01M 2/26
[52] U.S. Cl. ................................... 429/161; 429/123; 29/623.1; 29/623.5
[58] Field of Search .............. 429/161, 158, 123, 149, 429/181, 160, 65; 29/623.1, 623.5

[56] References Cited

U.S. PATENT DOCUMENTS

| | | | |
|---|---|---|---|
| 4,376,156 | 5/1981 | Wheadon | 429/161 |
| 4,464,827 | 8/1984 | Hardin | 429/161 |
| 4,719,159 | 1/1988 | Clarke et al. | 429/160 |
| 5,053,295 | 10/1991 | Hope et al. | 429/161 |

FOREIGN PATENT DOCUMENTS 105975 8/1980 Japan.

Primary Examiner—José G. Dees
Assistant Examiner—Samuel Barts
Attorney, Agent, or Firm—Israel Nissenbaum

[57] ABSTRACT

Internal intercell and terminal cell electrical connector elements in an electrochemical battery are protected from corrosion and build-up of high internal resistance by coating the electrical connector elements with a layer of a protective preferably non-conductive viscous material such as silicone, prior to pressure contacting or welding of the electrical connector elements. The silicone is removed only at the point of contact between the connector elements while retaining a surrounding protective barrier against the corrosive effects of the cell components and particularly corrosive fluid organic electrolyte materials in high energy density cells.

13 Claims, 3 Drawing Sheets

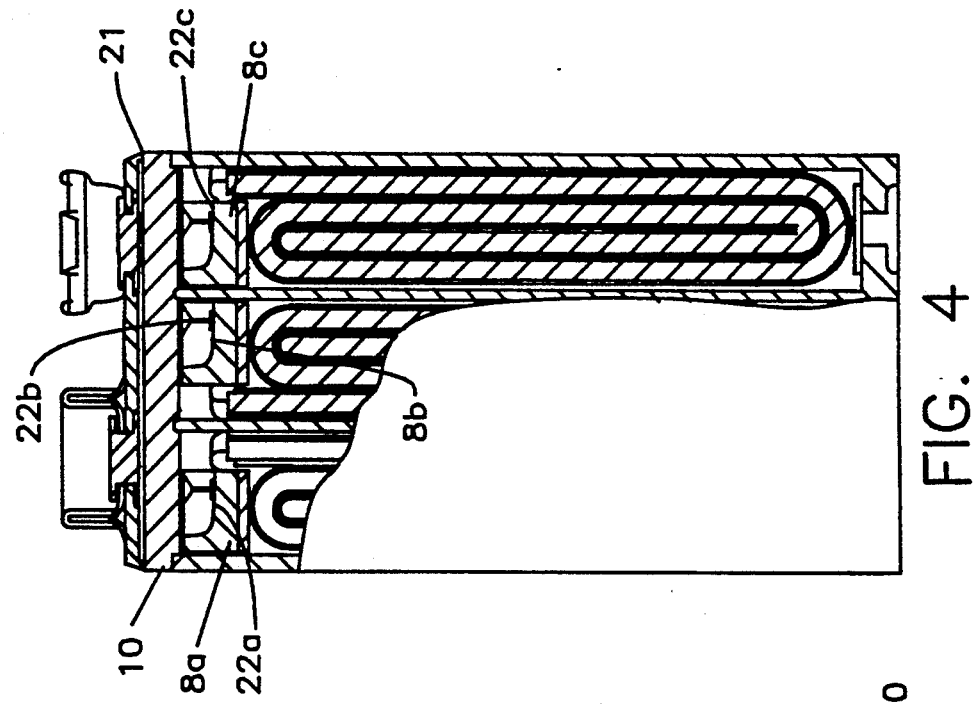
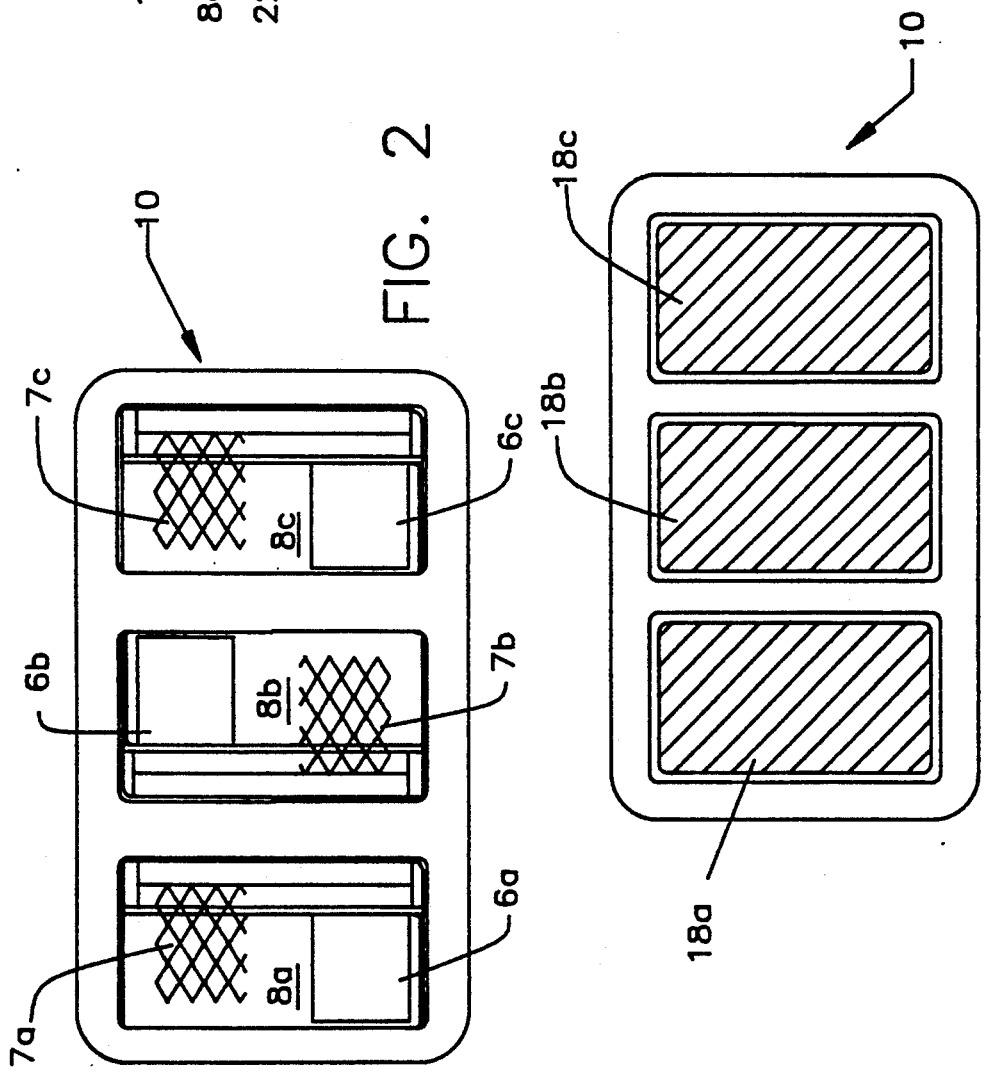

BATTERY CONNECTOR PROTECTION

FIELD OF THE INVENTION

This invention relates to batteries formed by multiple electrochemical cells having intercell electrical connectors and internal connectors from terminal cells to the battery terminals. The invention particularly relates to high energy density lithium type batteries containing corrosive or film forming organic electrolyte materials.

BACKGROUND OF THE INVENTION

Electrochemical batteries are typically made of two or more electrochemical cells electrically linked in series, for higher voltage output; in parallel, for higher current capability; or in series-parallel arrangements. The individual electrochemical cells (anode, cathode and separator) are either separately contained, with a cell electrolyte, in individually sealed containers; or they are separated by compartments but not sealed apart from each other.

Pressure or welded cell electrical interconnectors between separately sealed cells, provide little, if any, problems relating to corrosion and loss of connection integrity resulting from corrosion. These connections are external to the corrosive cell components and accordingly are not subject to degradation. The separately sealed cells are however not desirable because of reduced electrochemical cell capacity resulting from the wasted volume of the separate cell containers and seals. It has therefore been the practice to simply separate cell components of a battery by thin partitions without elaborate sealing of compartments formed by the partitions. An additional advantage of the latter construction is that, without the separate sealed cell containers, cells are capable of being electrically interconnected by means of bare portions, e.g. integral extending tab portions, of the electrode substrates (typically stainless steel foil or grid). These tabs are electrically connected by either pressure contacts or by being welded together and to the external battery terminals to electrically connect the cells and to form the battery. However, despite the resistance of stainless steel (the commonly utilized electrode substrate) to corrosion, the contact areas are subject to enhanced corrosion rates because of increased electrical resistance at these points. In addition, particularly in high energy density organic cells having electrolyte solvents such as propylene carbonate, films of insulative material tend to form on the electrical connectors. These films, particularly at the anode, cause high internal resistance and premature failure of the cells and batteries. Pressure contact connections are particularly susceptible to failure because of film growth and corrosion. The high potential at which the connection sites are kept (particularly in high energy density lithium containing cells) further exacerbates connection failures.

SUMMARY OF THE INVENTION

It is therefore an object of the present invention to provide a means for protecting and maintaining the integrity of intercell and internal terminal connections, particularly contact type connections, in an electrochemical battery.

It is a further object of the present invention to provide a battery having reduced susceptibility to internal resistance build-up and having enhanced long term performance.

These and other objects, features and advantages of the present invention will become more evident from the following discussion and drawings in which:

SHORT DESCRIPTION OF THE DRAWINGS

FIG. 2 is a view of the battery of FIG. 1, taken along line 2—2 prior to placement of the protective material;

FIG. 3 is the view of FIG. 2 with placement of the protective material;

FIG. 4 is a partially sectioned side view of the battery of FIGS. 1-3 after construction.

DETAILED DESCRIPTION OF THE INVENTION

Figure 1:
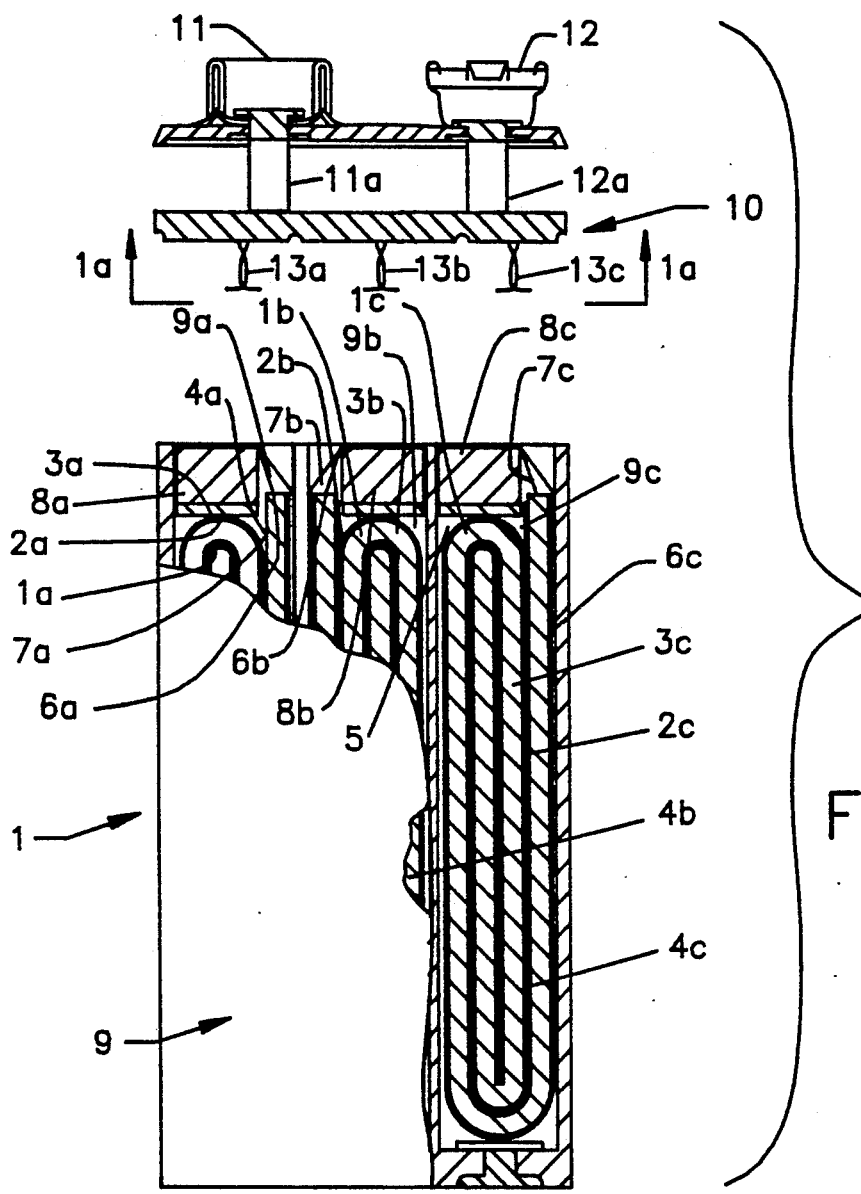
FIG. 1 is a partially sectioned exploded view of the battery of the present invention during construction.

Generally, the present invention comprise a method for maintaining electrical connection integrity within a battery having one or more electrochemical cells; and batteries having such electrical connections with maintained integrity. The method of the present invention is particularly effective in maintaining the integrity of pressure contact interconnection sites without build-up of high internal resistances at such sites.

In accordance with the present invention, contrary to normal practice, a layer of a protective viscous material, substantially inert to the cell components, is placed at the selected sites to be connected and at least the immediate surrounding areas. If corrosion or film growth is endemic to a particular connection site, such as the anode in organic cells containing propylene carbonate, only such connection need be covered with the viscous protective layer.

The protective viscous material is placed on the connection sites prior to effecting the connection when the connection sites are internal to the battery structure and are normally exposed to film forming and corrosive battery and cell components.

It is normally the practice, prior to effecting electrical pressure contacts or welded connection, to clean and degrease the metal members which are to be electrically connected. The cleaning ensures that bare metal surfaces touch each other for positive pressure contact or welding. It has also been the normal practice, in order to protect the completed connection against corrosion, with external electrical connections (e.g. automobile battery terminal connections), to apply a layer of an insulative protective material such as petroleum jelly to the exterior of the connection. Such expedient is however not utilized with internal battery connections, either because it was not believed to be necessary with a sealed system not exposed to outside contaminants.

In a preferred embodiment of the present invention, the protective viscous material is non-conductive, thereby obviating possible internal intercell short circuiting. The non-conductive nature of the preferred protective material thereby permits it to be applied to even non-electrically connected positive and negative terminals with a single application. However, in order to effect a proper electrical connection it is required that the connection process removes the protective material at the connection contact site but not the surrounding environs. Similar complete removal need not be effected, at the connection site, with conductive protective viscous material, but care must be taken in applying and containing the material to avoid short circuiting.

The viscosity of the material is such that it can be made to flow away from connection site, with the connection operation, while maintaining a fluid tight protective seal therearound. The viscosity also is preferably of a sufficiently fluid nature whereby it can be readily applied but of sufficient viscosity whereby it can also be readily confined, particularly if it is of a conductive type.

Electrical interconnectors, as defined herein, and electrical connection sites includes those interconnectors and sites which connect electrodes of the respective cells, in the appropriate parallel or series configuration, and the interconnectors or sites between electrodes and external terminal members of the battery. In a preferred embodiment these interconnectors electrically bridge the electrodes and bridge the electrodes and the external terminal members and are pressure biased against integral metal extensions of the electrodes.

As described above, in accordance with the present invention, wherein the insulative protective material is placed prior to the connection, it is necessary that the insulative material be removed from between the elements to be interconnected but only at the point of interconnection, such as the pressure contact site. It has been discovered that a flexibly buttressed pressure contact, effectively disrupts the barrier interposed by the insulative material during the connection procedure. The layer of insulative material should however be sufficiently thin to allow for such disruption while maintaining a sufficiently protective barrier surrounding the contact site. Generally at least about a 10 mil (about 0.025 mm) thick layer of protective material provides for both ready disruption and a maintained barrier around the connection. Supports of silicone rubber for the pressure connections, are sufficiently inert and resilient to provide the requisite flexible buttressing support. Altrnately the cell core itself can provide such a buttressing support to the side wall or base of the cell. A suitable protective viscous material is silicone, a dimethyl polysiloxane fluid with a silica thickener. Silicone is substantially inert to the corrosive materials contained in organic lithium cells, is normally insulative, and is suitably disrupted by pressure contact. Conductive additives such as carbon or graphite may be mixed with the silicone, if desired, to make it conductive. Other protective viscous materials include petroleum jelly and synthetic waxes.

DETAILED DESCRIPTION OF THE DRAWINGS AND THE PREFERRED EMBODIMENT

With specific reference to the drawings, in FIG. 1 a battery 1, contained within polypropylene housing 9, is comprised of electrochemical cell elements 1a-c. The cell elements are comprised of sandwiches of anodes 2a-c, cathodes 3a-c and separators 4a-c therebetween respectively, each wound in a "G" fold and placed within cell compartments 9a-c respectively. Cell 1b is placed within cell compartment 9b in a direction opposite that of the placement of cells 1a and 1c, for purposes of appropriate interconnection. Each anode is comprised of lithium foil laminated on a stainless steel substrate, with an unlaminated end portion or tab being 6a-c, respectively, extending from the ends of anodes 2a-c respectively for electrical interconnection with the other cells. Cathodes 3a-c are comprised of a powdered cathode active material, such as manganese dioxide, coated on a stainless steel screen substrate. Cathodes 3a-c have uncoated portions of the stainless steel screen 7a-c, respectively, extending from the ends thereof for electrical interconnection with the other cells.

Figure 1A:
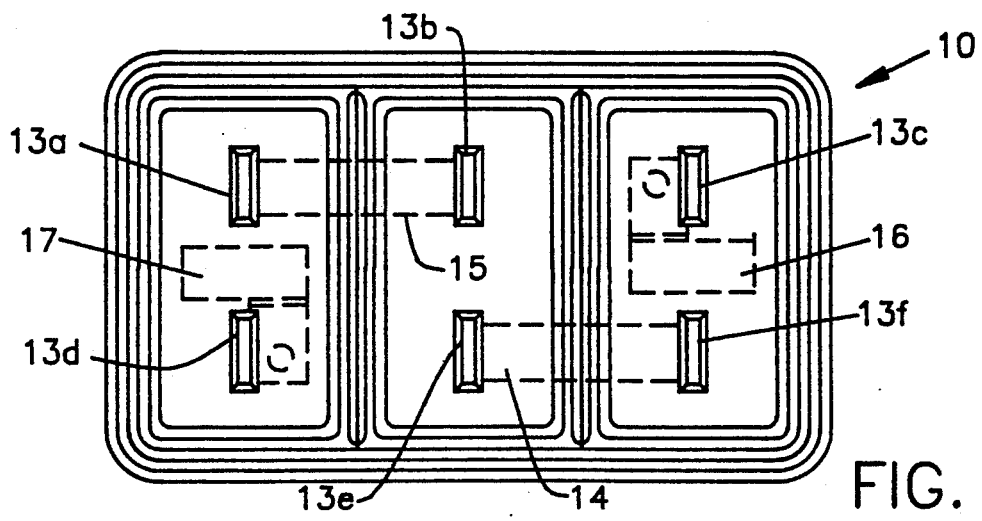
FIG. 1a is a view of the battery cover of FIG. 1 taken along line 1a—1a, with interconnectors molded therein as shown by dashed lines.

As shown in FIGS. 1 and 2, the electrode ends 6a-c and 7a-c are positioned above flexible silicone support pads 8a-c respectively for subsequent pressure contact connection with "T" hook interconnectors 13a-f respectively (as shown in FIG. 4). Interconnectors 13a-f as shown in FIGS. 1 and 1a, are formed from tabs which are slit for a short distance and bent to form the "T". The "T" hook connectors 13a-f are anchored in insulative molded plastic cover member 10 and are connectively configured with inset molded metal tab members 14 and 15 to electrically interconnect the cells in series. Inset molded metal tab members 16 and 17, with oppositely opposed exposed welding surfaces, are electrically connected to positive (male) and negative (female) external terminal connections 11 and 12 respectively with welded connections via weld tab members 11a and 12a respectively. The dashed lines in FIG. 1a show the fully imbedded interconnection elements 14 and 15 which electrically interconnect anode and cathode tabs 6a and 7b and 6b and 7c respectively. Terminal connection elements 16 and 17 engage anode tab 6c and cathode tab 7a for electrical interconnection to the external terminal elements 11 and 12 respectively.

The respective electrode tabs 6a-c and 7a-c, folded above the pads, as shown in FIG. 2, are shown in FIG. 3 as being covered with thin layers of insulative viscous material 18a-c (with the application shown, the viscous material is also insulative). The battery 1 is thereafter completed, as shown in FIG. 4, with the placement and ultrasonic welding of the battery cover 10 on battery container 9. The "T" hook connectors 13a-f are forced into contact with the viscous protective material (13a, 13d with 18a; 13b, 13e with 18b; and 13c, 13f with 18c) and into direct contact with the adjacent surfaces of anode and cathode tabs 6a-c and 7a-c. The "T" of the respective connectors, cuts through the viscous protective material and pushes aside sufficient viscous protective material to permit the direct contact with the adjacent tab while maintaining a protective barrier of the material around the connection site.

As shown at 22a-c, the resilient pads 8a-c are compressed and pressure bias the initial contact between the "T" connectors into the viscous material and into contact with the adjacent tabs. The pads also resiliently maintain the pressure contacts during the life of the battery.

As an illustration of the effectiveness of the present invention the following comparative tests were conducted.

EXAMPLE

Figure 5:
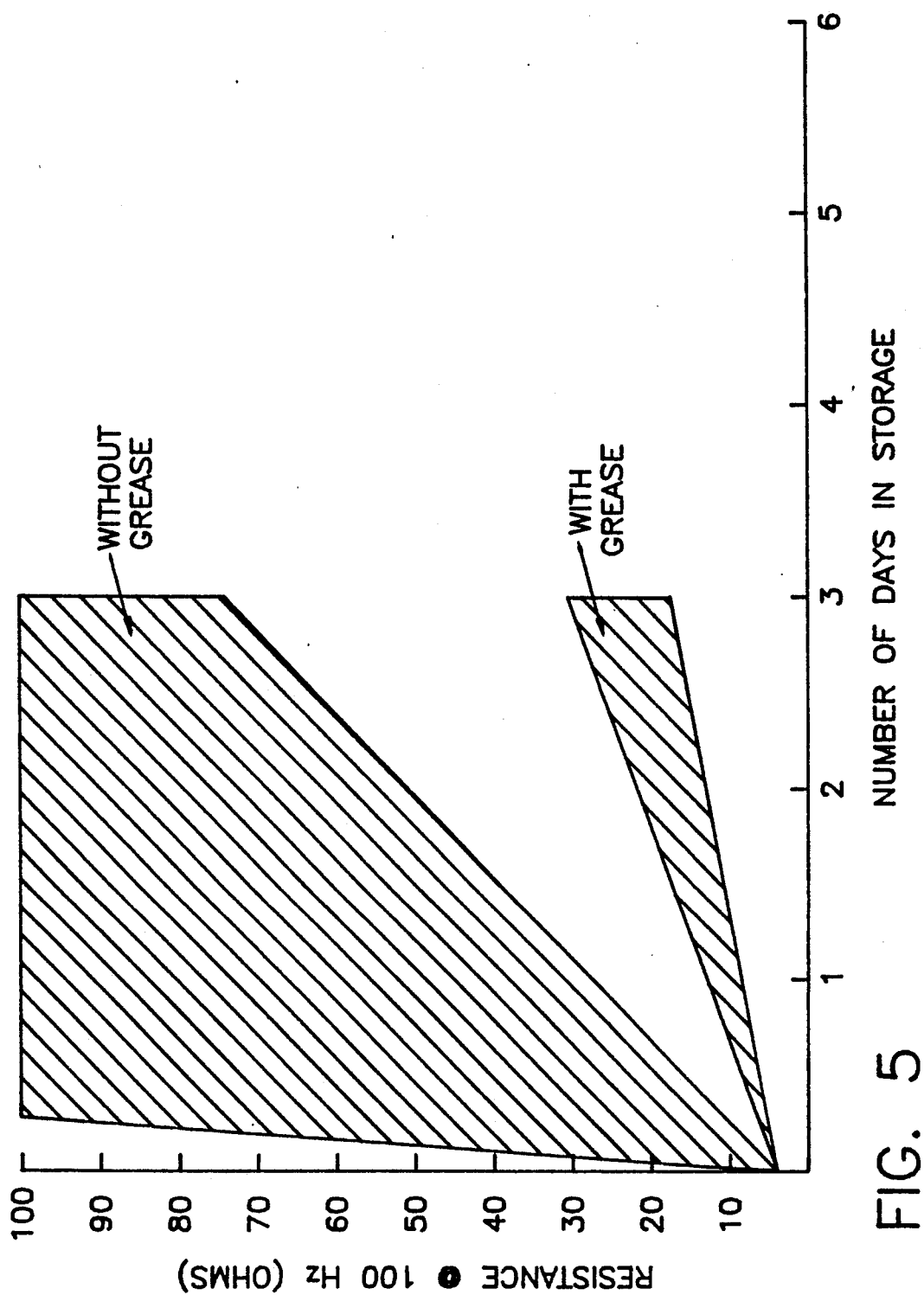
FIG. 5 is a comparative graph showing battery performance with and without application of the protective material of the present invention.

Two batteries, as shown in FIG. 4, were identically constructed except with the first having a 10-15 mil thick layer of silicone (dimethylpolysiloxane with silica thickener) protective material placed on the terminal tab connection areas as shown in FIG. 3. The second battery was made as shown in FIG. 2, without the protective material. Each battery was filled with an electrolyte of a 60:40 propylene carbonate-1,3 dioxolane electrolyte solvent and a lithium hexafluoroarsenate electrolyte salt to form a 0.8 M electrolyte solution. The anode in each cell was lithium foil on stainless steel foil and the cathode was a mixture of manganese dioxide, carbon and polytetrafluoroethylene binder. In order to simulate corrosions over long time spans, the resistance of each battery was measured after 60° C./95 relative humidity storage. The results over given time spans are shown in comparative graph of FIG. 5.

After three days the internal resistance of the battery with the protective coating is less than a third that of the battery with unprotected electrical interconnections.

It is understood that the above drawings and example are illustrative of the present invention and that changes may be made in cell and battery components, structures, protective materials and applications and the like without departing from the scope of the present invention as defined in the following claims.

What is claimed is:

1. A method for maintaining electrical connection integrity within a battery having one or more electrochemical cells, wherein said cells are electrically interconnected and for electrically connected to external battery terminals by conductive elements, said conductive elements being electrically connected, within said battery, to effect the electrical interconnection between the cells and/or the electrical connection to the external battery terminals and wherein the site of at least one electrical connection between said conductive elements is subject to a build up of electrical resistance; said method comprising the steps of:
   a) placing a layer of a protective viscous material, substantially inert to the cell components, between the conductive elements, prior to their connection, at said site and at least the immediate area surrounding said site;
   b) effecting said at least one electrical connection such that the protective viscous material does not impede the electrical connection and wherein the protective viscous material substantially completely encloses the at least one electrical connection, whereby physical access of battery components to said site is substantially precluded.

2. The method of claim 1, wherein said protective viscous material is an electrical insulator and whereby effecting said at least one electrical connection removes the protective insulative viscous material from said site.

3. The method of claim 2, wherein said protective viscous material is comprised of silicone.

4. The method of claim 3, wherein said at least one electrical connection comprises a biased pressure contact connection.

5. The method of claim 4, wherein said biased pressure is provided by compression of a silicone rubber pad which supports said at least one electrical connection.

6. The method of claim 4, wherein said conductive elements comprise integral conductive extensions of the anode and of the cathode of the respective electrochemical cells within said battery and wherein said viscous protective material is placed on at least one of said integral conductive extensions, prior to effecting the at least one electrical connection.

7. The method of claim 4, wherein said biased pressure is provided by the cell core.

8. The method of claim 2, wherein at least one of the conductive elements of said electrical connection comprises means for cutting through said protective viscous material and peripherally pushing the protective viscous material to surround said electrical connection.

9. The method of claim 8, wherein said means for cutting and peripherally pushing the protective viscous material comprises said conductive element being comprised of a metal tab having a short centrally located longitudinal slit in an end thereof with the portions of the metal tab adjacent the slit being bent perpendicular to the tab and in directions opposite each other to form a "T" configuration and wherein the bent portions effect said cutting and pushing.

10. The method of claim 9, wherein said layer of protective viscous material is at least about 10 mils (0.254 mm) thick.

11. The method of claim 2, wherein each of said cells has an anode comprised of lithium.

12. The method of claim 11, wherein the electrolyte for each of said cells is comprised of propylene carbonate and said protective viscous material is placed on an electrical connection from the anode of each of said cells.

13. An electrochemical battery made with integrity protected electrical connections in accordance with the method of claim 1.

* * * * *